United States Patent
Gruber

(10) Patent No.: US 12,481,268 B2
(45) Date of Patent: Nov. 25, 2025

(54) COMPUTER-IMPLEMENTED METHOD FOR COMPUTER-AIDED GENERATION OF AN EXECUTABLE CONTROL PROGRAM FOR THE CONTROL AND/OR REGULATION OF A TECHNICAL PROCESS

(71) Applicant: Markus Gruber, Soding (AT)

(72) Inventor: Markus Gruber, Soding (AT)

( * ) Notice: Subject to any disclaimer, the term of this patent is extended or adjusted under 35 U.S.C. 154(b) by 738 days.

(21) Appl. No.: 17/595,474

(22) PCT Filed: Apr. 27, 2020

(86) PCT No.: PCT/AT2020/060169
§ 371 (c)(1),
(2) Date: Apr. 7, 2022

(87) PCT Pub. No.: WO2020/232486
PCT Pub. Date: Nov. 26, 2020

(65) Prior Publication Data
US 2022/0244709 A1 Aug. 4, 2022

(30) Foreign Application Priority Data
May 20, 2019 (AT) .............. A 50458/2019

(51) Int. Cl.
*G05B 19/4155* (2006.01)
*G06F 8/41* (2018.01)

(52) U.S. Cl.
CPC ........... *G05B 19/4155* (2013.01); *G06F 8/44* (2013.01); *G05B 2219/31372* (2013.01)

(58) Field of Classification Search
CPC ...... G05B 19/4155; G05B 2219/31372; G05B 2219/23258; G05B 19/0426; G05B 13/00;
(Continued)

(56) References Cited

U.S. PATENT DOCUMENTS 5,301,100 A * 4/1994 Wagner .............. G05B 19/0426
700/19
5,748,628 A * 5/1998 Ericson .............. H04Q 11/0457
370/384
(Continued)

FOREIGN PATENT DOCUMENTS

EP 2447845 A1 5/2012
JP 2006012017 A * 1/2006 ............... G06F 8/34

OTHER PUBLICATIONS

International Search Report and Written Opinion issued in Application No. PCT/AT2020/060169 dated Jul. 15, 2020.
(Continued)

*Primary Examiner* — Thomas C Lee
*Assistant Examiner* — Tyler Dean Hedrick
(74) *Attorney, Agent, or Firm* — Workman Nydegger

(57) ABSTRACT

A method for controlling a technical process. The functionality of a control program is determined by states, input signals, and output signals via an operating interface and subsequently converted, by a computer, into an executable program code. An input table describes the functionality of the control program. Each state and input signal of the technical process is assigned a line/column of the input table by defining, in each cell of the input table, signal change waiting for transition to next state, or monitored for error detection, or random. In every defined state, input signals defined in the input table are either continuously monitored with regard to a signal change or an error condition, or randomly set and consequently not monitored by the program code. During creation of the program code, a check table provides all bit combinations of input signals information on which meaning or processing bit combinations were assigned.

7 Claims, 3 Drawing Sheets

(58) Field of Classification Search
CPC ....... G05B 19/00; G05B 19/0405; G06F 8/44; G06F 8/34; Y02P 90/30
See application file for complete search history.

(56) References Cited

U.S. PATENT DOCUMENTS

| | | | |
|---|---|---|---|
| 6,968,291 B1 * | 11/2005 | Desai | G06F 11/3058 370/254 |
| 11,050,673 B2 * | 6/2021 | Lessmann | H04L 45/64 |
| 2008/0147949 A1 * | 6/2008 | Miyake | G06F 11/14 714/E11.178 |
| 2011/0230983 A1 | 9/2011 | Koepcke et al. | |
| 2015/0018977 A1 | 1/2015 | Law et al. | |
| 2015/0125836 A1 * | 5/2015 | Daniel | G09B 19/24 434/234 |
| 2021/0397152 A1 * | 12/2021 | Chen | G05B 19/0426 |

OTHER PUBLICATIONS

International Preliminary Report on Patentability issued in Application No. PCT/AT2020/060169 dated Apr. 1, 2021.
International Preliminary Report on Patentability received for PCT Patent Application No. PCT/AT2020/060169, mailed on Apr. 1, 2021, 22 pages (5 pages of English Translation and 17 pages of Original Document).

* cited by examiner

All possible bit patterns are processed and
defined in a clear manner

16

| | E1 | E2 | E3 | |
|---|---|---|---|---|
| N.d. state or transition | 0 | 0 | 0 | |
| Display E1 missing | 0 | 0 | 1 | State 4 |
| Display E1 missing | 0 | 1 | 0 | State 1 |
| Error = pair check | 0 | 1 | 1 | |
| N.d. state or transition | 1 | 0 | 0 | |
| Transition Z2 | 1 | 0 | 1 | State 3 |
| Transition Z1 | 1 | 1 | 0 | State 2 |
| Error = pair check | 1 | 1 | 1 | |

FIG.4

COMPUTER-IMPLEMENTED METHOD FOR COMPUTER-AIDED GENERATION OF AN EXECUTABLE CONTROL PROGRAM FOR THE CONTROL AND/OR REGULATION OF A TECHNICAL PROCESS

The present application is a U.S. National Stage of International Application No. PCT/AT2020/060169, filed on Apr. 27, 2020, designating the United States and claiming the priority of Austrian Patent Application No. A50458/2019 filed with the Austrian Patent Office on May 20, 2019. All of the aforementioned applications are incorporated herein in their respective entireties by this reference.

The invention relates to a computer-implemented method for the computer-aided generation of an executable control program for controlling and/or regulating a technical process, wherein the functionality of the control program is determined by means of states, input signals and output signals via an operating interface and subsequently converted into an executable program code.

Control or regulation of a technical process in, for example, a manufacturing facility is conducted by system computers which are provided with a plurality of input signals. Such an input signal for the system computer can, for example, come from a position sensor monitoring the position of a piston in a cylinder, or from a temperature sensor monitoring the temperature of a liquid in a container, or from a timer setting the drying time of a product. A technical process comprises a plurality of process variables in the form of input signals, output signals, states, and error conditions, with even a very simple technical process being influenced by a majority of these process variables. The more technical components have to be controlled or regulated by a technical process, the larger the number of process variables that the technical process comprises. For example, with regard to at a refinery for producing gasoline, it is immediately obvious how many input signals and output signals the individual technical components of the refinery will comprise and how many states they may be in, so that the combination of all possibilities of these process variables result in an almost unmanageable large number of planned and unplanned sequences of the technical process for producing gasoline.

DE 10 2015 109 662 A1 discloses such a method for the computer-aided generation of an executable control program, wherein the functionality of the control program is set by a technician via a graphic user interface. Blocks in a block diagram identify the states, and signal lines the transitions from one state of the technical process to the next state. Since such a graphic user interface is complex even in simple technical processes, this state of the art describes dissecting the graphic model of the control program into submodels. By dissecting the graphic user interface, however, it becomes more complicated. A further disadvantage of this known method is that there were unexpected error states during the execution of the control program for controlling or regulating the technical process generated by the method, which errors resulted in the failure of technical processes and subsequently to production losses.

EP 0 707 248 A1 discloses a further method for the computer-implemented generation of an executable control program, wherein again a graphic user interface is used for setting the functionality of the technical process. In order to reduce the complexity of the graphic user surface, certain groups of the graphic objects are assigned to a "view" by means of program attributes, so that the group of graphic objects can be displayed or hidden by activating or deactivating the respective program attributes. A classic line/table-type display of the user interface is mentioned as disadvantageous because it is presumably not clear enough. A further disadvantage of this method was that there were unexpected error states during the execution of the control program for controlling or regulating the technical process generated with the method, which errors resulted in the failure of technical processes and subsequently to production losses.

US 2015/0018977 A1 discloses a further method for the computer-aided generation of an executable control program, wherein states and state transitions are set according to a table. However, the known method describes only selected states and does not allow for seamless monitoring of error states, which is disadvantageous. Furthermore, a larger number of input signals leads to a "state explosion problem" known to the skilled person, regarding how to deal with the complexly large number of possible states of the system.

It is the object of the present invention to create a computer-implemented method for the computer-aided generation of an implementable control program for controlling and/or regulating a technical process avoiding the disadvantages of the state of the art.

According to the invention, the present object is achieved with the process steps of the process according to claim 1.

The invention is based on the finding that in known processes, the operating surfaces for describing the technical process do not fully describe the process to be controlled or regulated with all its different states and all possible combinations of input signals. Known operating surfaces are suitable to describe states and also state transitions of a technical process proceeding as planned as well as certain defined error states, but there are always combinations of input signals or sequences of states that are not taken into account. Often, the reason is that the technician defining the technical process is convinced that it is impossible that such a state or such a combination of input signals will occur. As soon as the technical process has more than a few technical components, the most frequent reason is that the operating surface does not provide any help for handling all possible combinations in a defined manner.

The invention solves this problem either by monitoring every input signal in every defined state according to a definition in an input table either continuously with regard to a signal change or error condition, or by setting it randomly and consequently not monitoring it.

Consequently, any deviation of the technical process is immediately recognized. In addition, the inventive structure of the input table providing a full description of the technical process allows for a structured definition of all states and state transitions, which prevents that certain input signal combinations are not considered upfront and would then lead to a loss in production while the process is running, which can be verified by means of a check table. With this new linkage of technical parameters in the input table, which contains all information for a code generator to create a control program for controlling the technical process in one place, the technical object of reducing standstills of production processes is solved, so that technicity of the invention is provided.

Further advantageous implementations of the inventive methods will be described below with reference to the figures.

FIG. 4 shows a check table that is also displayable on the display means for checking the full description of the technical process through the input table and the working table.

Figure 1:
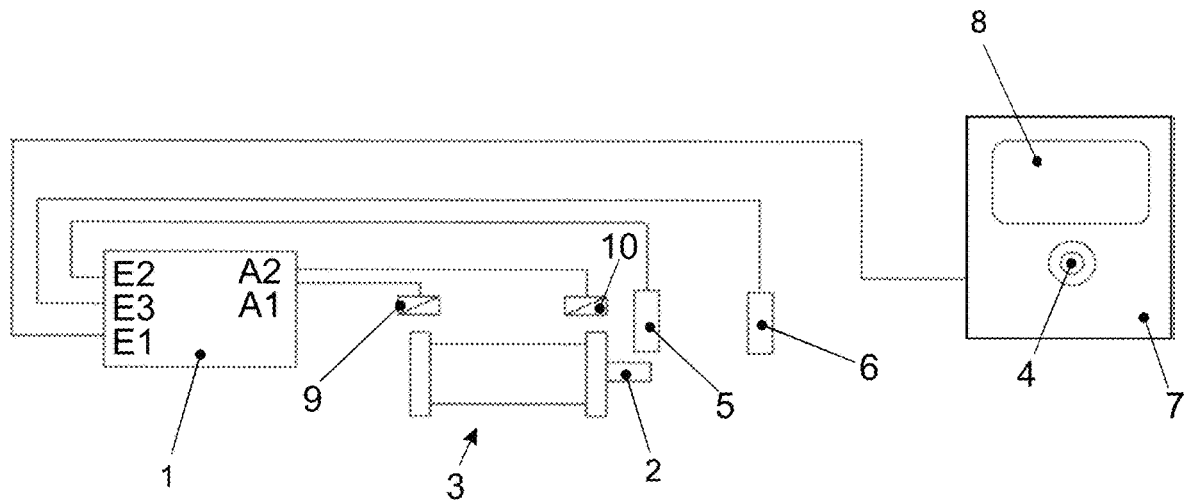
FIG. 1 shows the technical components of a technical process controlled by a control program according to a first implementation example of the invention.

FIG. 1 shows the technical components of a technical process controlled by a control program according to a first exemplary embodiment of the invention. A control computer 1 is designed to execute the control program in order to move a piston 2 of a cylinder 3 from a "back" position to a "front" position and vice versa. When the button 4 is pressed, it emits a first input signal E1 to the control computer 1. When a first sensor 5 detects the piston 2 in the "back" position, the first sensor 5 emits a second input signal E2 to the control computer 1. When a second sensor 6 detects the piston 2 in the "front" position, the second sensor 6 emits a third input signal E3 to the control computer 1. An input/output unit 7 comprises a display 8, the button 4 and further buttons, not shown, for inputting information. The control computer 1 emits an output signal A1 to a first valve 9 in order to move the piston 2 from the "back" position to the "front" position. The control computer emits an output signal A2 to a second valve 10 in order to move the piston 2 from the "front" positon to the "back" position.

The sequence of the technical process to be executed by the simple system comprising only few technical components may be summarized as follows: when the piston 2 is in the "back" position and the button 4 is pressed, the control computer 1 emits the first output signal A1 to the first valve 9, so that the piston 2 moves to the "front" position. When the piston 2 is in the "front" position and the button 4 is pressed, the control computer 1 emits the output signal A2 to the second valve 10, so that the piston 2 moves to the "back" position. This sequence of the technical process in the states Z1 to Z4 is the first step towards a full description of the system as shown in FIG. 2.

Figure 2:
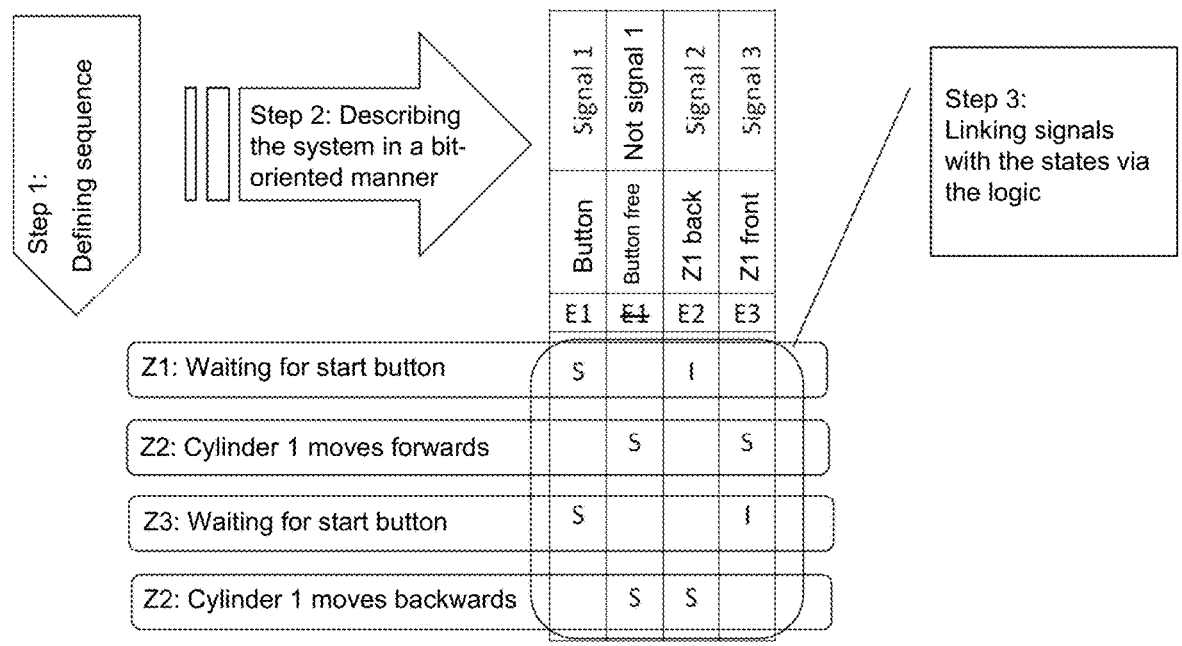
FIG. 2 shows the inventive steps for fully describing the technical process in an input table via inputs from a user.

FIG. 2 shows how, in a second step, based on this definition of the sequence of the technical process in the input table 11, the sequence can be set in a bit-oriented matter via inputs by a user. The four states Z1 to Z4 of the sequence are contained in four lines of the input table 11 and the input signals E1 to E3 are contained in the columns of the input table 11. The inverse first input signal E1 is contained in a separate column as further input signal because pressing the button 4 continuously should not lead to an uncontrolled change of the position of the piston 2 from "front" to "back" and again to "front". In a third step of the inventive method, the input signals E1 to E3 and E3 are then linked with the states via the logic.

To do this, the user enters an "S" in one line of the input table 11 when a signal change S has to be monitored in the respective state Z1 to Z4. For example, in state Z1, when the system waits for the input signal E1 from button 4. In addition, the user enters "I" in a cell of the input table 11 when the input signal has to be monitored in the respective state Z1 to Z4. In state Z1, for example, when the input signal E2 has to have the bit "1" in order to make sure that the piston is detected in the "back" position. All other cells, in which the user does not enter an "S" or an "I", can contain any value, i.e., the input signals E1 to E3 may in this state have either the bit "0" or the bit "1" without having any influence on the sequence of the technical process. Marking with the letters "S" and "I" is, of course, only one example of an input option, however, the user may use any numbers or characters when filling in the input table 11.

For the computer-aided generation of an executable control program for the control computer 1, in order to have the technical process described above run by the control computer 1 in a controlled manner, the control program is now generated by the control computer 1 or another computer based on the input table 11, the function of which program is recognizable from the working table 12 and which is also displayable on the display 8. In a first section 13 of the working table 12 shown in FIG. 3, the four states Z1 to Z4 are contained in lines and the input signals E1 to E3 and E1 are contained in columns. According to the input of the user in the input table 11, bits "0" and "1" are inserted in a first section 13 of the working table 12 for fully describing the functionality of the control program, wherein fields of the first section 13 of the working table 12 may be left empty when the input signal may be random in this state according to the input in the input table 11.

Figure 3:
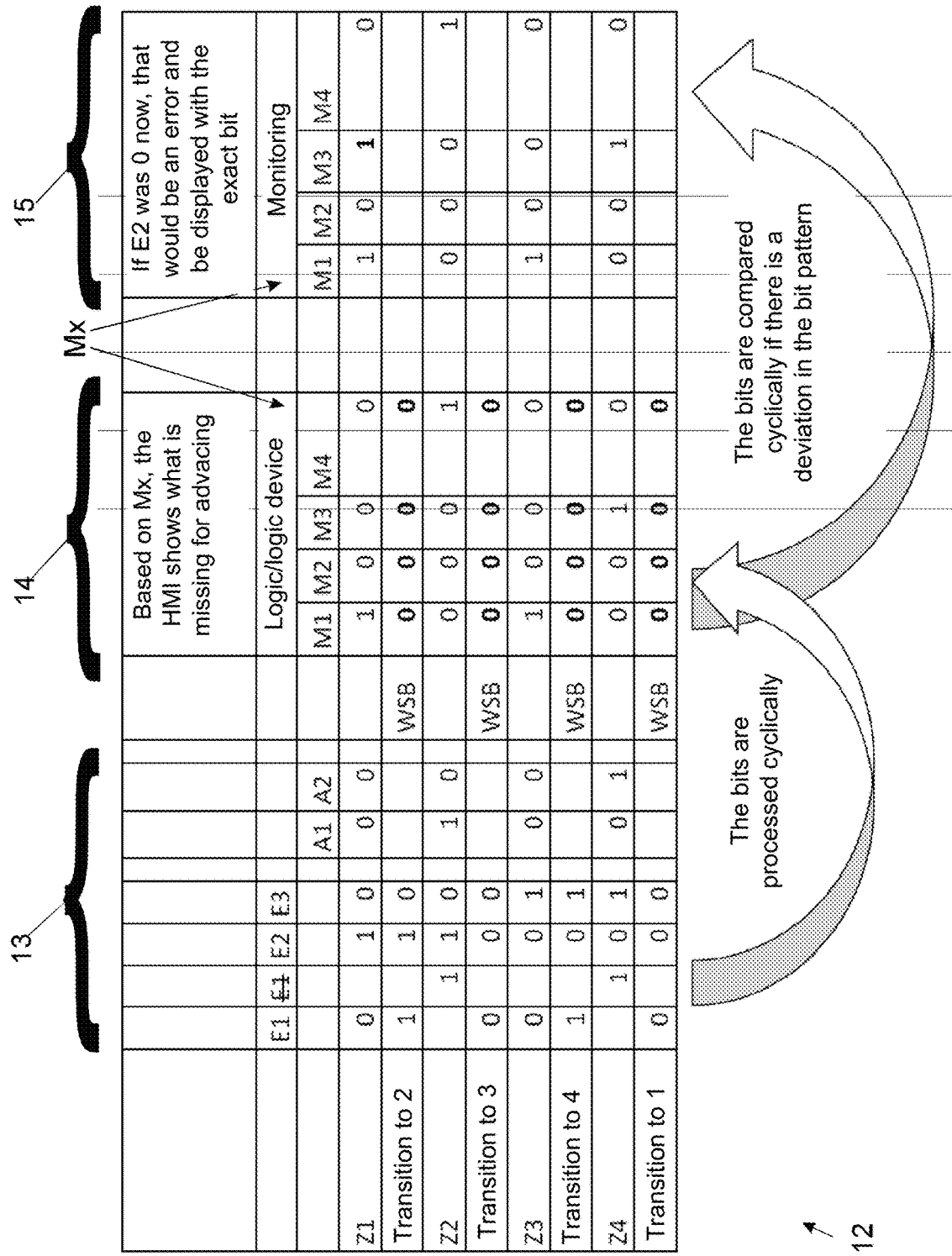
FIG. 3 shows a working table that is at least partly displayed on display means and which is filled in from the input table.

FIG. 3 shows the inventive working table 12 having also the state transitions from one state to the respectively following states included in four further lines of the working table 12. In further columns, the output signals A1 and A2 of the control computer 1 to the valves 9 and 10 were also included. This first section 13 of the working table 12 describes all inputs E1 to E3 and all outputs A1 and A2 of the technical components of the system according to FIG. 1 in any and all possible states of the system.

In a second section 14 of the working table 12, the states Z1 to Z4 and the state transitions have been assigned matrix bits Mx in four columns M1 to M4. The columns M1 to M4 correspond to the inputs E1, E1, E2 and E3, with the matrix bits Mx showing the bit "1" whenever the system waits for this input signal in this state, and showing the bit "0" whenever the control computer 1 does wait for this input signal to continue to the next state.

In a third section 15 of the working table 12, error states corresponding to the input by the user in the input table 11 are contained and monitored by the control program generated therefrom, which error states are to lead to an error message on the display 8 in the respective state or state transition in case of a discrepancy when the control program conducts a cyclic comparison of the bits in the second section 14 and the third section 15 of the working table. This third section of the working table 12 is filled in according to the input of the user and can be verified or checked with the aid of an inventive check table 16 shown in FIG. 4, which will be described below.

In the check table 16, all possible bit combinations of the three input signals E1 to E3 are contained in lines, and the control computer or computer that creates the executable control program specifies, based on the input table 11 and/or the working table 12, for each of these bit combinations what the bit combination means. For example, the bit combination 1-1-1, i.e., when all three input signals have switching voltage, means that there must be an error state of the system because the piston 2 cannot be simultaneously be detected by the first sensor 5 in the "back" position and by the second sensor 6 in the "front" position. The same error state of the system is also present with the bit combination 0-1-1 because with this bit combination again both input signals E2 and E3 have switching voltage. This check table 16 serves for the user to check that in fact any possible combination of the input signals E1 to E3 has been assigned a meaning or processing. This seamless monitoring of all inputs of the system during any possible state or state transition provides a particularly reliable control program for controlling and/or regulating a technical process.

After completing this full description of the functionality of the technical process by manually setting bits in the input table 11, the computer-aided generation of the executable control program for controlling and/or regulating the technical process can be started by the user. A skilled person will familiar with this automatic translation of a process described by a table or a graphic model into an executable control program in a machine language or a higher programming language, as is e.g., described in DE 10 2015 109 662 A1. The present description will therefore not go into detail here because the invention is within the field of seamless tabular descriptions of technical processes. After generating the executable program code, it is loaded into the program storage of the control computer 1, the technical process is brought into a defined state—e.g. state Z1, and the execution of the control program is started by the user. Parts of the working table 12 and optionally check table 16 created by the control computer 1 or another computer with the creation of the control program can be displayed on the display 8 before, during and after the execution of the technical process to keep the user informed.

Below, the sequence of the technical process controlled by the control computer 1 via the execution of the program code generated based on the seamless description in working table 12 and check table 16 will be described. In state 1, the piston 2 is in the "back" position, which is why in the first section 13, only the input signal E2 of the first sensor 5 has the bit "1" or switching voltage, while in the second section 14, the matrix bit M1 has the bit "1" because the button 4, i.e., the input signal E1, is required before advancing to state 2. In the third section 15, it may be seen in the first line of state 1 that the matrix bit M3 shown in bold font is monitored with regard to the fact whether it has the bit "1". If the bit "0" is present, i.e. the input signal E2 of the first sensor 5 shows that the piston 2 is not in the "back" position and thus state 1 is not present, there is an error that would be displayed to the user by means of display 8. By looking at the working table 12 shown on display 8, the user can see in which state the technical process is and which sensor emits an unexpected sensor signal as input signal. By looking at the actual position of the piston, the user can easily recognize the error of the system and correct it, e.g. by replacing the first sensor 5.

Furthermore, the matrix bit M1 shown in normal font in the third section 15 is monitored in the first state Z1 with regard to the fact whether it already has the bit "1", which would show that the input signal E1 has switching voltage after the button 4 was pressed. When this monitored advancing condition WSB is detected by the control computer 1 by means of the bits given in the line "Transition to 2", the control computer 1 advances to state 2 of the system and emits the output signal A1 to the first valve 9, whereafter the piston 2 moves to the "front" position. The advancing condition from state 2 to state 3 is reached when the piston 2 has reached the "front" position and the input signal E3 has switching voltage, which corresponds to the bit "1" in the monitored matrix bit M4 in the third section of state Z2. In state 3, the system again waits for the input signal E1 after the button 4 was pressed, which corresponds to bit "1" in the monitored matrix bit M1 in the third section 15. When the button 4 is pressed, the control computer advances to state 4 and emits the output signal A2 to the second valve 10, so that the piston 2 moves to the "back" position. As soon as the first sensor 5 emits the input signal E2 to the control computer 1, which is detected through the bit "1" in the monitored matrix bit 2 in the third section 15, the control computer switches back to state 1, after which the entire technical process has been run through once. The advancing conditions WSB are always characterized by all matrix bits Mx in the second section 14 of the working table 12 having the bit "0". In another embodiment variation of the invention, the advancing condition WSB could be characterized by all matrix bits Mx having the bit "1".

The check table 16 allows checking whether the bits entered into the working table 12 are complete, however, creating the working table 12 would also be possible without checking it with the check table 16.

It could be mentioned that the working table 12 could, of course, also be created and used reversely with regard to lines and columns. In this case, the states Z1 to Z4 would be contained in columns, and the input signals E1 to E3, the output signals A1 and A2, and the matrix bits Mx would be arranged in the lines. This alternative arrangement also provides the advantage that the technical process of the system is fully described in order to allow the computer-aided creation of the executable program code to be executed with the control computer 1. When executing the program code for controlling and/or regulating the technical process it is thus guaranteed that all possible combinations of input signals result in a preset processing. Be it that the next state of the "state machine" is entered or the user is displayed a defined error, which allows an immediate solution based on the information in the table.

The inventive method was described with reference to a very simple technical process with only one cylinder 3 and one piston 2 that is only movable to two positions. Its actual advantage becomes apparent when using the approach described with a technical process comprising a plurality of different technical devices, as is, for example, the case in a semi- or fully automated production process.

The invention claimed is:

1. A method for generation and use of an executable control program for controlling and/or regulating a technical process, in which the following operations are performed:

defining the functionality of the executable control program by respective states of respective technical components that are configured and arranged to cooperatively implement the technical process, respective input signals to the technical components, and respective output signals generated by the technical components and transmitted via an operating interface;

converting the defined functionality of the control program into an executable program code, wherein an input table filled in via the operating interface fully describes the control program, wherein each of the states is assigned a line/column of the input table, such that the input table includes all possible states of each of the technical components, including any error states, and each of the input signals is assigned a column/line of the input table in order to fully describe the technical process in the input table by defining, in each cell of the input table, signal change(S) waiting for transition to next state, or monitored (I) for error detection, or random, wherein in every one of the defined states, every one of the input signals is, according to the definition in the input table, either continuously monitored with regard to a signal change or an error condition, or randomly set and consequently not monitored by the executable program code, and wherein during the computer-aided creation of the executable control program from the input table a check table provides for all possible bit combinations of the input signals information on which meaning or processing these bit combinations were assigned; and controlling performance of the technical process using the executable control program.

2. The method of claim 1, wherein, during the creation of the executable control program from the input table, a working table is created, in which every state of the technical components is assigned a line/column of the working table and every input signal to the technical components is assigned a column/line in a first area of the working table in order to fully describe the technical process in the working table by defining the expected input signals for the transition to the next state in a second area of the working table and by defining the monitored input signals for error detection in a third area of the working table.

3. The method of claim 2, wherein, in further lines/columns of the working table placed between the states, one line each is provided for the transition from one state to the subsequent state, wherein the expected input signals must all have the bit zero or all have the bit one in these lines/columns.

4. The method of claim 2, wherein each theoretically possible bit combination of input signals is assignable, in the control table, a state of the working table or monitored error in the third area of the working table or transitions in the working table in order to verify the full description of the technical process in the working table.

5. The method of claim 2, wherein during a simulation of the control and/or regulation of the technical process by the executable control program based on the working table with a display means, the respectively next input signal will be marked that is expected for the transition of the current to the next state.

6. A non-transitory computer readable storage medium carrying the executable program code of the control program of claim 1, and the executable program code is executable by a hardware processor.

7. A non-transitory computer readable storage medium carrying instructions that are executable by a hardware processor to perform the operations of claim 1.

* * * * *